United States Patent
Fry

(10) Patent No.: US 11,379,693 B1
(45) Date of Patent: Jul. 5, 2022

(54) SYSTEM AND METHOD OF NEW UNDERSTANDABLE TRAINING FOR AI AS APPLIED TO ELECTROMAGNETIC SENSOR DETECTION

(71) Applicant: The Government of the United States of America, as represented by the Secretary of Homeland Security, Washington, DC (US)

(72) Inventor: Mark A. Fry, Marco Island, FL (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 17/516,872

(22) Filed: Nov. 2, 2021

Related U.S. Application Data

(60) Provisional application No. 63/222,754, filed on Jul. 16, 2021.

(51) Int. Cl.
*G06K 9/00* (2006.01)
*G06K 9/62* (2022.01)
*G06T 7/50* (2017.01)

(52) U.S. Cl.
CPC ......... *G06K 9/6257* (2013.01); *G06K 9/6262* (2013.01); *G06T 7/50* (2017.01); *G06T 2207/10116* (2013.01)

(58) Field of Classification Search
CPC ...... G06K 9/6257; G06K 9/6262; G06T 7/50; G06T 2207/10116
See application file for complete search history.

(56) References Cited

U.S. PATENT DOCUMENTS

| | | | |
|---|---|---|---|
| 11,211,161 B2 * | 12/2021 | Lyman | A61B 6/032 |
| 2018/0336677 A1 * | 11/2018 | Sloan | G06T 7/0012 |
| 2019/0197662 A1 * | 6/2019 | Sloan | G06N 5/04 |
| 2019/0236773 A1 * | 8/2019 | Gros | G06N 3/084 |
| 2020/0019617 A1 * | 1/2020 | Eswaran | G16H 30/20 |
| 2021/0158107 A1 * | 5/2021 | Karanam | G06K 9/00201 |
| 2021/0287045 A1 * | 9/2021 | Curtin | G06K 9/4604 |
| 2021/0287141 A1 * | 9/2021 | Molloy | G06K 9/6215 |
| 2021/0390414 A1 * | 12/2021 | Schneider | G06K 9/6262 |

OTHER PUBLICATIONS

AO Zhang, et al., "RADDet: Range-Azimuth-Doppler based Radar Object Detection for Dynamic Road Users", May 2, 2021, arXiv:2105. 00363v1 [cs.CV], http://www.site.uottawa.ca/research/viva/projects/raddet/index.html.

* cited by examiner

*Primary Examiner* — Ping Y Hsieh
(74) *Attorney, Agent, or Firm* — Lavanya Ratnam; Kelly G. Hyndman; Robert W. Busby

(57) ABSTRACT

Systems and methods are described, and an example method includes a training an artificial intelligence (AI) classifier of electromagnetic (EM) scanned items, including obtaining a training set of sample raw EM scans. The set includes a population of sample in-class raw EM scans, which include blocks of EM sensor data from EM scans of regions having in-class objects, and the set includes a population of sample not-in-class raw EM scans, which include blocks of EM sensor data from EM scan of regions without in-class objects. The example includes applying the AI classifier to sample raw EM scans in the training set, measuring errors in the results, and updating classifier parameters based on the errors, until detecting a training completion state.

20 Claims, 5 Drawing Sheets

SYSTEM AND METHOD OF NEW UNDERSTANDABLE TRAINING FOR AI AS APPLIED TO ELECTROMAGNETIC SENSOR DETECTION

CROSS-REFERENCE TO RELATED APPLICATIONS

This application claims the benefit under 35 U.S.C. § 119(e) to U.S. Provisional Patent Application No. 63/222,754, filed Jul. 16, 2021, entitled "System and Method of New Understandable Training for AI as Applied to Electromagnetic Sensor Detection," which is hereby incorporated by reference in its entirety.

STATEMENT OF GOVERNMENT INTEREST

The present invention was made by employees of the United States Department of Homeland Security (DHS) in the performance of their official duties. The U.S. Government has certain rights in this invention.

FIELD

Embodiments disclosed herein generally relate to artificial intelligence (AI) based detection and classification for electromagnetic screening processes.

BACKGROUND

In order to provide safety and security to individuals at, for example, airports, train stations, and various facilities requiring controlled ingress or egress individuals may require screening. The screening may include carry items, baggage, or other items. Screening may be necessary for concealed objects-of-interest (OOI) such as weapons, explosives, prohibited substances and the like. Current screening methods include electromagnetic (EM) scanning such as, but not limited to, millimeter wave (MMW) scanning and X-ray scanning. EM scanners in such venues and elsewhere may include a display screen for viewing by trained security personnel. Such EM scanners often include or are coupled to computerized image analysis tools, providing various OOI detection and classification capabilities.

Early versions of such image analysis tools used combinations of image feature extraction tools, e.g., edge extractors, and conventional classifiers, such as $K^{th}$ nearest neighbor classifiers, and logistic regression classifiers. Early versions required manual effort to select the classification processes and classification parameters, which often required significant effort and time.

Machine-learning (ML) artificial intelligence (AI) classifiers provide algorithm-inherent optimization, with respect to training samples, of AI classifier parameters. A widely used form of ML AI classifier is the artificial neural network (NN). Typically, an NN includes multiple layers of trainable weighting nodes, with layer-to-layer feed-forward node interconnections, and activated by trainable parameter activation functions. Supervised ML processes feed what can be human selected training samples to the artificial NN classifier and, in response to errors, perform iterative adjustment of the node weights and the activation function parameters of the node activation functions, the adjustment being in a direction of error reduction.

A result of the ML process can be what appears as a reasonable performance AI classifier.

However, the AI classifier can include unintended bias. The bias can result, for example, from human bias in selecting training images. One such bias can include unconscious bias toward images that appear, in the judgment of the human selecting the samples, as most characteristic or most representative of the object(s) to be detected/classified.

SUMMARY

Methods are disclosed and an example can include a method for training an artificial intelligence (AI) classifier of electromagnetic (EM) scanned items, which can comprise obtaining a training set of sample raw EM scans, including a population of sample in-class raw EM scans and a population of sample not-in-class raw EM scans, sample in-class raw EM scans including a corresponding block of EM sensor data generated in an EM scan of a spatial region that includes one or more in-class objects, and sample not-in-class raw EM scans including a corresponding block of EM sensor data generated in an EM scan of a spatial region that includes no in-class objects. The example can include initializing AI classifier parameters of the AI classifier, and applying the AI classifier to a plurality of sample raw EM scans in the training set, measuring errors in results of applying the AI classifier, and updating at least one of the AI classifier parameters based on the errors.

Other methods are disclosed and an example can include a method for AI classification EM scanned items, which can include EM scanning a subject, including transmitting an EM scan energy toward the subject, receiving an EM return, and, based on the EM return, generating an EM return reception signal, and generating a raw EM sample block, based on a sampling of the EM return reception signal. The example can include AI classifying the raw EM sample block between likely including and likely not including samples of EM return from an in-class object, and generating an alarm, based at least in part on a positive result of the AI classifying.

In an aspect, the example can further comprise the AI classifying being a first AI classifying and can still further include generating a two-dimensional (2D) pixel array image file, which can include a 2D array of visible spectra pixels, based at least in part on the raw EM sample block, and can also include generating a visible appearance improved 2D pixel array image file, based at least in part on applying a visible appearance improvement process to the 2D pixel array image file. The example aspect can include a second AI classifying the visible appearance improved 2D pixel array image file, between likely including and likely not including a 2D image of in-class object.

Computer-readable storage media are disclosed an example can include a tangible, non-transitory computer-readable storage medium, embodying computer-readable instructions that cause a hardware processor to perform an AI classification of EM scanned items, including receiving samples of an EM scanning a subject, including samples of an EM return reception signal, which corresponds to transmitting an EM scan energy toward the subject, receiving an EM return, and, based on the EM return, generating the EM return reception signal. The example computer-readable instructions can include instructions for the hardware processor to perform generating a raw EM sample block, based on the samples of the EM return reception signal, perform an AI classifying of the raw EM sample block between likely including and likely not including samples of EM return from an in-class object, and for generating an alarm, based at least in part on a positive result of the AI classifying.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

DETAILED DESCRIPTION

Figure 1:
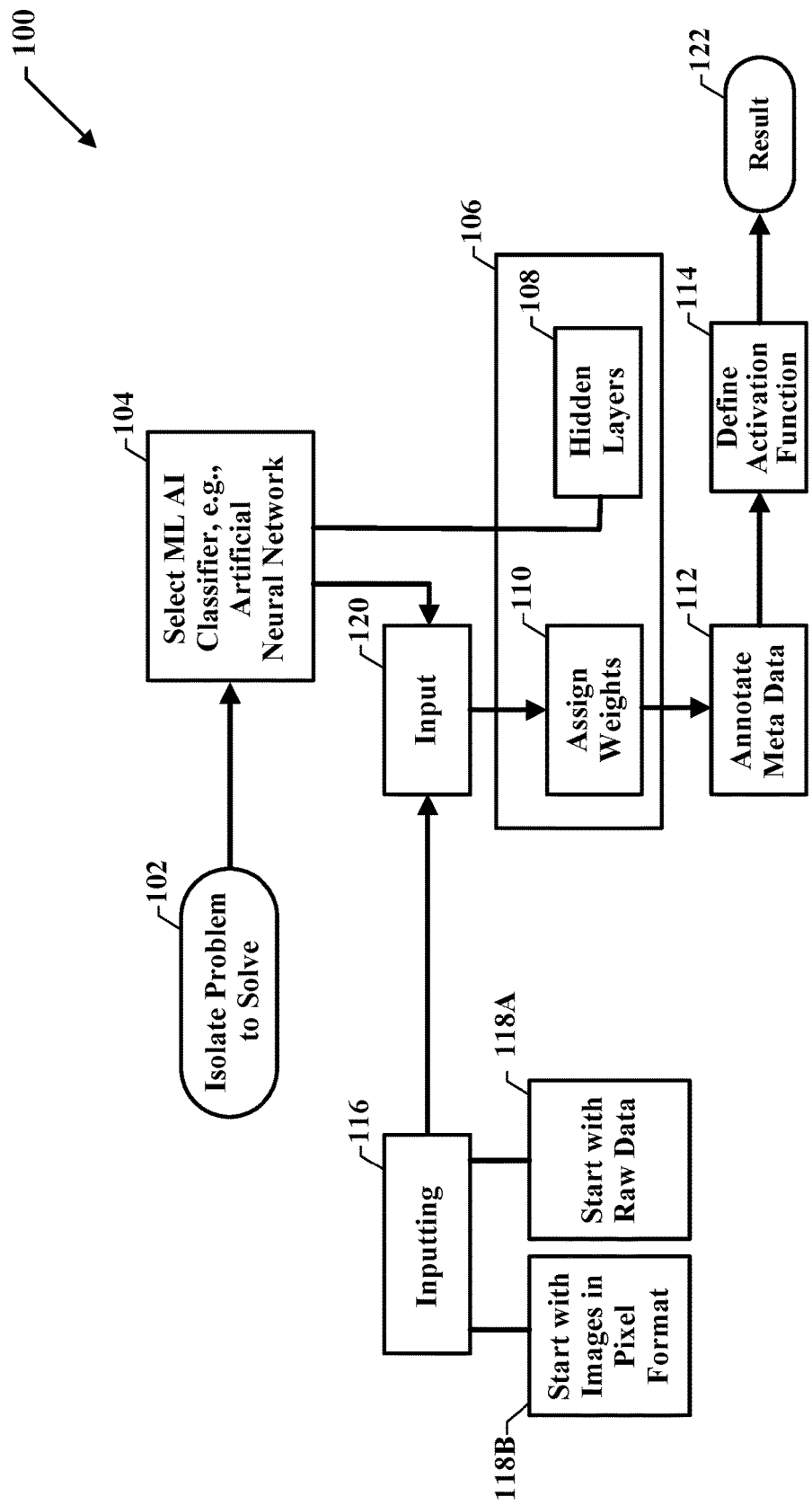
FIG. 1 illustrates a logic flow diagram of a process of structuring and training an EM raw scanning information AI neural network detector-classifier according to various embodiments.

In the drawings, like reference numerals designate identical or corresponding parts throughout the several views. The drawings are generally not drawn to scale unless specified otherwise or illustrating schematic structures or flowcharts. As used herein, the words "a," "an" and the like generally carry a meaning of "one or more," unless stated otherwise.

The term "X-ray," as used herein in the context of backscatter X-ray scanners, will be understood to mean a low energy X-ray that "backscatters" from the human body surface, as opposed to substantially higher energy X-rays that pass through the body, for detection by sensors facing the opposite side of the body, e.g., as used in medical X-rays.

One example environment includes a computer-implemented machine learning (ML) classifier, defined in accordance with an AI classifier algorithm. It can be implemented as a special purpose computer. In an embodiment, implementations of the special purpose computer can include a hardware processor coupled to a tangible storage medium that can store computer-readable instructions that, when executed by the hardware processor, create a raw EM sample trained, ML classifier structure, special purpose computer.

In an embodiment, the raw EM sample trained, ML classifier structure can include an ML classifier type structural aspect, and can include an ML, raw EM sample trained structural aspect. The ML classifier type structural aspect can be in accordance with an ML classifier type. ML classifier types contemplated by one or more embodiments can include, but are not limited to, ML artificial NN classifier, ML kth nearest neighbor (KNN) classifier, ML decision tree classifier, ML support vector machine (SVM) classifier, and ML logistic regression classifier.

In an embodiment, the raw EM sample trained, ML classifier structure can feature an evolving structure. The evolving structure can include, for example, an origin structure or structural state and, in an embodiment, can self-evolve, through one or more raw EM sample training processes described in greater detail in later sections, to the EM sample trained, ML classifier structure.

In an embodiment, the one or more raw EM sample training processes can include supervised training. In the same or another embodiment, the one or more raw EM sample training processes can include unsupervised training.

A raw EM sensor data trained ML OOI classifier structure according to an embodiment can provide binary classification e.g., OOI present-OOI not present. In another embodiment, a raw EM sensor data trained ML OOI classifier can provide multi-tag OOI classification, e.g., no OOI present, OOI type q1 present, OOI type q2 present, and so forth.

In an embodiment, raw EM sensor data training can include constructing a training set. The training set can include integer TN samples, which can include an approximately equal number of raw EM sensor data samples of each of Q different OOI classes.

An environment of a raw EM sample trained, ML classifier in accordance with one or more embodiments can include the above-described special purpose computer. For example, a special purpose computer can be a computing system particularly configured by computer-readable instructions, logically coupled to an electromagnetic (EM) scanning apparatus, e.g., but not limited to, an X-ray backscatter scanner, a millimeter-wave (MMW) scanner, or both.

In an embodiment, features of the particular logic coupling can include direct access by the special purpose computer to raw data, for example, samples of outputs of EM receivers of the EM scanner "as is," prior to EM data filtering processes, e.g., EM noise filtering, non-linear attenuation or amplification.

In an implementation according to the above-described embodiments, both for human visual inspection and for input to conventional AI object detector/classifiers, the raw data stream is passed through conversion algorithms. The conversion algorithms include pixel forming algorithms, which can convert the raw data stream into two-dimensional pixel array, e.g., an N×M pixel array or pixel array image file. The N×M pixel array can be a translation into a visible light pixel image of visible spectra pixels, of the backscatter from, for example, a person's body surface and/or the surface of any concealed object having an EM reflectivity, absorption, or backscatter different than that of the person's body surface.

In an embodiment, a combination of a raw EM sample trained, ML classifier and a conventional visible pixel array trained classifier can be provided. In one such embodiment, a second level classifier, configured to receive the output of the raw EM sample trained, ML classifier and the output of the conventional visible pixel array classifier can be provided. In one implementation, the activation function of the output layer of the raw EM sample trained, ML classifier and of the conventional visible pixel array classifier can be omitted. In such an implementation, a normalization can be applied to the outputs of the EM sample trained, ML classifier and the outputs of the conventional visible pixel array classifier prior to their respective feeds to the second level classifier.

FIG. 1 shows a diagram of a flow 100 of example operations in a process of raw EM scanner data training an artificial NN classifier to receive and classify raw EM scan "captures" into Q different classes. The artificial NN classifier can be, but is not necessarily, a convolutional neural network (CNN). The value Q can be one, two, or up to any integer.

The raw EM scan capture can be, but is not necessarily a "snap-shot" of an EM signal reflection or backscatter from the subject being scanned. For example, a raw EM scan capture can include a block of sample data, from one or more EM sensors of an MMW scanner, generated over a scan duration. An example MMW duration can be, but is not limited to, approximately 5 to 10 seconds. The block of samples can be alternatively referred to as a "frame." In an embodiment using X-ray backscatter as the EM scan, the block of sample data can be a block of samples of an X-ray backscatter reception signal that can be output from one or more X-ray backscatter sensors EM sensors.

An instance of the flow 100 can include a defining or isolating 102 of the problem to solve. Guidelines in the defining 102 can include, but are not limited to, identifying what events, conditions, or situations need to be detected, and identifying the requisite granularity of classification. Operations in the flow 100 can include choosing or selecting 104 the ML classifier, e.g., as a ML artificial NN classifier. The selecting 104 can include a further specificity, such as selecting the ML artificial NN classifier as a CNN. The flow 100 can include defining 106 configuration parameters of the selected ML classifier. The FIG. 1 defining 106 assumes, for purposes of example, the ML classifier as a CNN, and accordingly includes the number of hidden layers 108 and assigning of weights 110.

Assigning weights 110 can include initialization of weights using, in a form of transfer learning, weights resulting from a training of a similarly configured ML artificial NN classifier for a similarly defined problem. Assigning weights 110 can also include initial random-number based assignment. Referring to FIG. 1, operations in the flow 100 can include annotating meta data 112. Annotating meta data 112 can include labels of object type, or labels of object characteristics, including, but not limited to, composition materials. The object characteristics can be referred to as class-characteristic EM features. Operations in the flow 100 can include defining 114 the activation functions, i.e., node activation or triggering functions, as described in greater detail in reference to FIG. 2. Operations in the flow 100 can include inputting 116 training data, either as raw data 118A or pixel format images 118B, for inputting 120 to the selected ML artificial NN, which produces a result 122. The raw data 118A can include sample raw EM scans, comprising a population of sample in-class raw EM scans and a population of sample not-in-class raw EM scans. A sample in-class raw EM scan can include a corresponding block or blocks of EM sensor data generated in an EM scan or scans of a subject, or a spatial region, e.g., a baggage item, which include one or more in-class objects. A sample not-in-class raw EM scan can include a corresponding block or blocks of EM sensor data generated in an EM scan or scans of a subject or a spatial region that includes no in-class objects.

Figure 2:
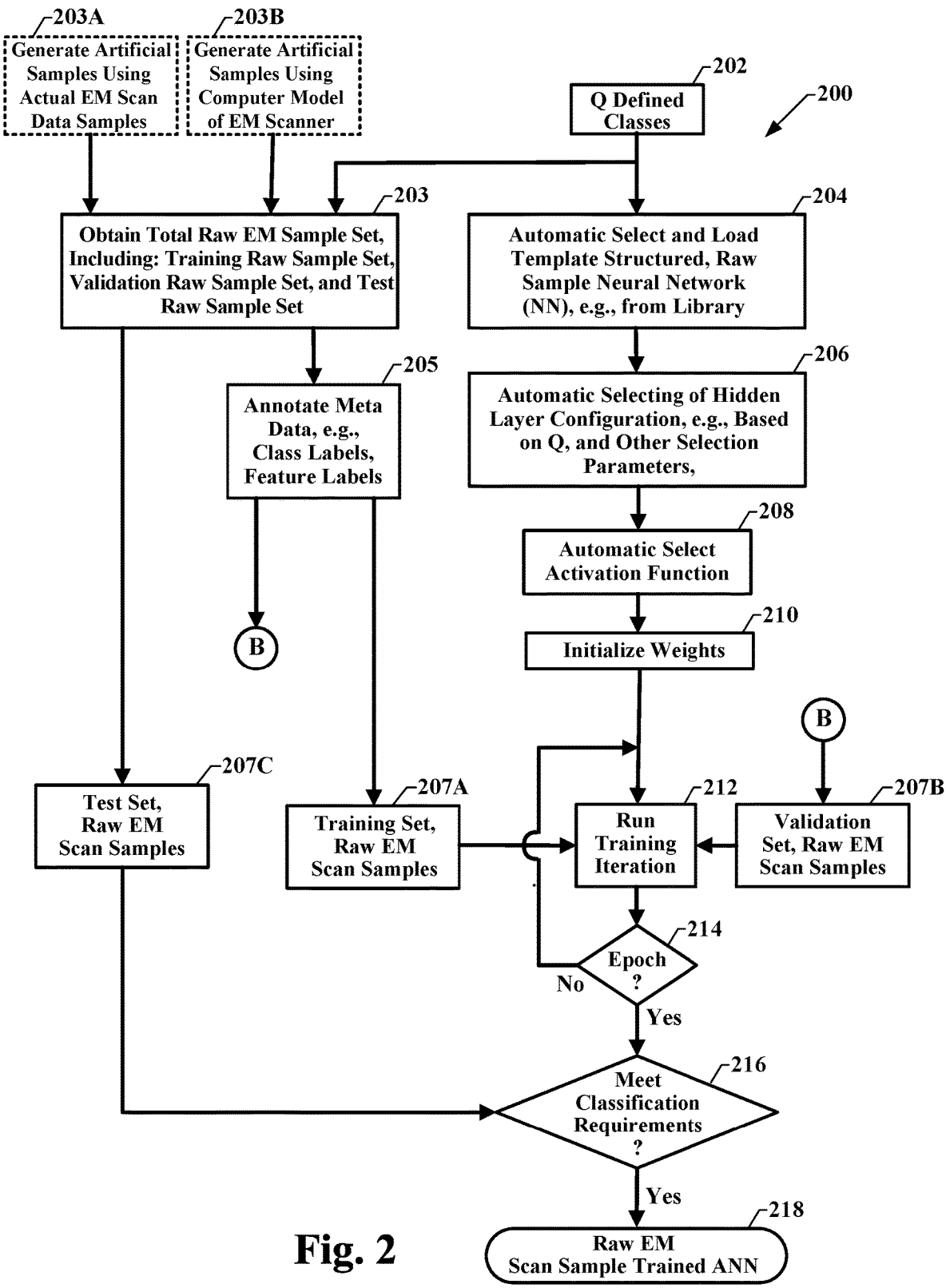
FIG. 2 illustrates a logic flow diagram of example operations in a process of EM raw scan data training of a convolutional neural network AI detector-classifier according to various embodiments.

FIG. 2 illustrates a logic flow diagram of a process of structuring and training an EM raw scanning information AI neural network detector-classifier according to various embodiments. An instance of process will be referred to as "flow 200." Description assumes integer Q defined classes 202 of a given OOI. For example, and without limitation, the OOI can be assumed as explosive materials, and Q can be assumed as three. The three classes can be referred to as q1, q2, and q3. In an instance the flow 200 can proceed to automatically selecting and loading 204 a template structured, raw EM sample artificial NN classifier, e.g., from a library. The template structured, raw EM sample artificial NN classifier can be, but is not necessarily, a CNN. Selection factors can include, but are not limited to, for example, the OOI, the value Q, descriptions of computational resources, throughput parameters, e.g., number of scans per hour, and accuracy specifications, such as minimum acceptable True Positive Rate (TPR), maximum acceptable false positive rate (FPR), and so forth.

The flow 200 can include obtaining 203 a raw EM scan data total sample set. The obtaining 203 can be concurrent or partially concurrent with, or not concurrent with the selecting and loading 204. In this context the phrase "total sample set" is used because the obtained samples, after annotation 205 with metadata such as, but not limited to, class labels and feature labels, can be separated into raw EM scan training samples 207A, a validation sample data set 207B, and a test sample data set 207C. The obtaining 203 can include EM scanning of samples, retrieval from a library of EM scanning data, obtaining EM scan samples from third-party supplies, or any combination or sub-combination thereof, In an embodiment, the obtaining 203 can include generating 203A of synthetic samples based on actual EM scan data samples. Such generation can use, for example, adaptations of known techniques used for synthetic generating of samples for training optical image classifiers. Such techniques can include, without limitation, perturbing of captured samples. The techniques can include a visible appearance improvement process. Examples of visible appearance improvement process can include, but are not limited to, one or more visible noise filter processes. Optical image techniques include, without limitation, cropping, repositioning, resizing, and altering of particular visible features.

In an embodiment, the obtaining 203 can utilize or include generating 203B of synthetic samples using a computer simulation model of a particular EM scanner, e.g., the particular EM scanner to which the raw EM scan data trained ML classifier will be connected. Implementation of such embodiments can utilize, for example, computer simulation models specific to EM scanner vendor product names, versions, and configurations. Implementations can also include adapting or adjusting such computer simulation models based, for example, on field-testing of the particular EM scanner.

Referring to FIG. 2, the flow 200 can proceed from automatic selection and loading 204 of a template structured, raw EM sample artificial NN classifier to automatic selecting 206 of hidden layer configuration. The hidden layer configuration can include the number of hidden layers, e.g., one, two, . . . NH, with "NH" being an integer specifying a maximum, and can include the size, i.e., number of nodes in the hidden layers. In an embodiment, the automatic selecting 206 can be an initial setting that may be updated based, for example, on in-process results in training operations later in the flow 200.

From automatic selecting 206 of hidden layer configuration, the flow 200 can proceed to automatic selecting 208 the activation function(s). The automatic selecting 208 can be from among, for example, and without limitation, the Sigmoid functions and the Rectified Linear Unit (ReLU) function.

The ReLU function is a threshold triggered linear function.

The Sigmoid function is generally defined by the Equation (1):

$$\frac{1}{1 + e^{(w^T x + b)}} \quad \text{Equation (1)}$$

The "x" and "b" values can be initialized and then updated through subsequent training operations.

Referring to FIG. 2, the flow 200 can include initializing 210 the node weights of the hidden layers, and the outer layer. The initializing 210 can use, for example and without limitation, random number initialization or, as described above, may use a form of transfer learning, weights resulting from a training of a similarly configured ML artificial NN classifier for a similarly defined problem.

It will be understood that the graphic order, and order of description of the automatic selection and loading 204, automatic selecting 206 of hidden layer configuration, automatic selecting 208 of activation function, and initializing 210 of node weights is for purposes of description, and is not intended as a limitation of the ordering of the operations being performed.

The flow 200, after automatic selection and loading 204, automatic selecting 206 of hidden layer configuration, automatic selecting 208 of activation function, and initializing 210 of node weights, can proceed to running 212 an iteration of the ML training. The iteration can be referred to a training step. The iteration or training step can apply the raw EM scan ML artificial NN classifier to an integer quantity IT of the raw EM scan training samples 207A. Associated with each application of the raw EM scan ML artificial NN classifier to a raw EM training sample can be an updating of the node weights. The updating can be configured as a process of reducing error cost. In an embodiment, the process can apply, for example and without limitation, "backward propagation of errors," a loss function based technique that is also referred to as "backpropagation." In an embodiment, associated with or more of the iterations of running 212 the raw EM scan ML artificial NN classifier can be an updating of the activation functions. In an implementation the validation raw EM samples that form the validation sample data set 207B can be used to correct overfitting.

After running 212 an iteration, the flow 200 can include determining 214 whether an epoch of the raw EM scan training samples 207A has been used. For purposes of description, "epoch" can be all of the raw EM scan training samples 207A, or can be a subset or portion of the raw EM scan training samples 207A. If the determining 214 indicates "No," the flow 200 can run 212 another iteration of the raw EM scan training samples 207A. If the determining 214 indicates "Yes," the flow 200 can proceed to testing 216 the raw EM scan ML artificial NN classifier. The testing 216 can use TPR, or FNR, or both, as an acceptance condition or criteria, or a training completion condition. As known to persons of ordinary skill in the classifier arts, TPR is defined as the ratio of the number of true (meaning accurate) positives to the sum of true positives and false negatives. As also known to such persons, FNR is defined as the ratio of the number of false negatives, to the sum of false negatives and true positives. If the testing 216 meets classification requirements, a Raw EM Scan Sample Trained ANN (Artificial Neural Network) is achieved.

Embodiments can include an EM scanner configured to perform EM scanning a subject, including transmitting an EM scan energy toward the subject, receiving an EM return, and, based on the EM return, generating an EM return reception signal. Embodiments can include analog to digital (A/D) conversion resources for generating, associated with the EM scan, a raw EM sample block, based on a sampling of the EM return reception signal. Embodiments can include an AI classifier, trained on EM raw sample data as described above, for AI classifying the raw EM sample block between likely including and likely not including samples of EM return from an in-class objects; and generating an alarm, based at least in part on a positive result of the AI classifying. The EM scanner can be a MMW scanner, configured to perform MMW scanning of the subject, including transmitting a MMW scan energy toward the subject, receiving a MMW return, and, based on the MMW wave return, generating a MMW wave return reception signal.

Figure 3:
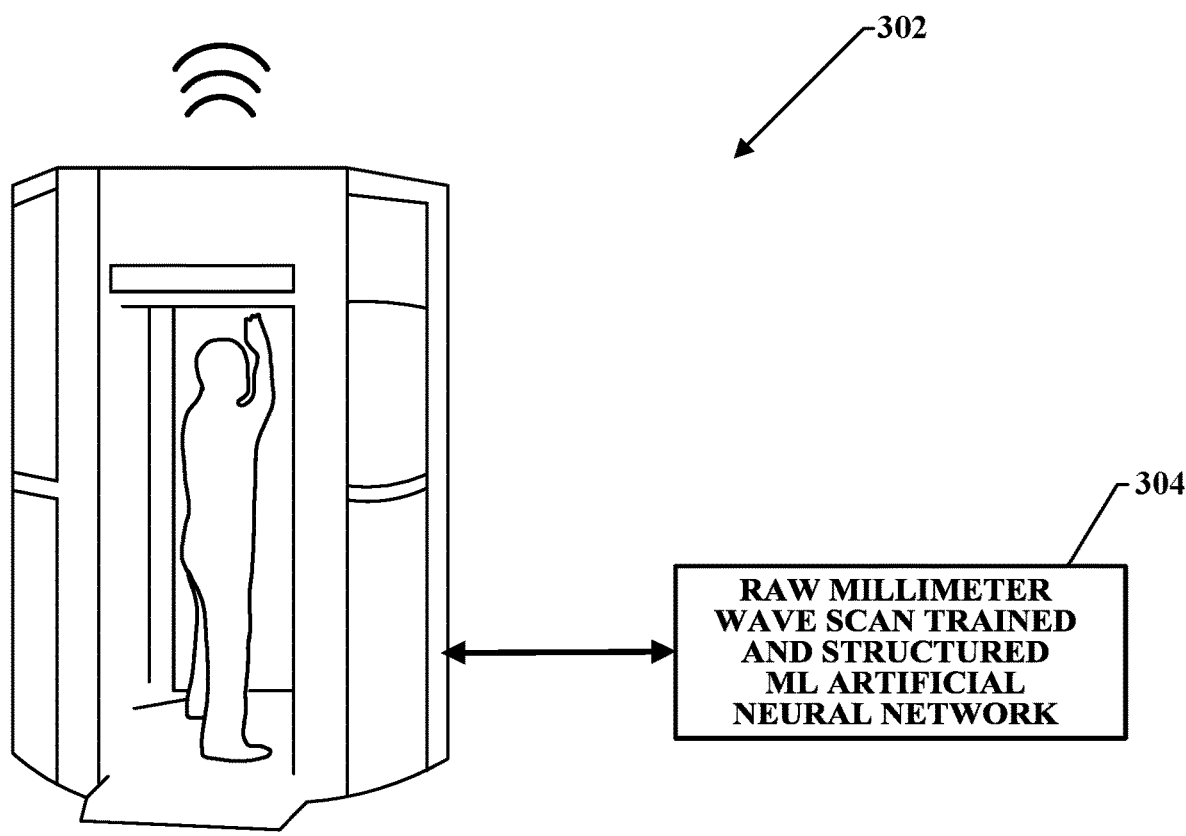
FIG. 3 illustrates a system of millimeter wave (MMW) scanning and raw MMW sample data based AI detecting and classifying of items of interest, in accordance with various embodiments.

FIG. 3 shows an example MMW scanner embodiment 300 of an EM sample trained, ML classifier system in accordance with this disclosure, including an MMW scanner 302 and a raw MMW sample trained, ML classifier 304. The MMW scanner 302 is configured to perform MMW scanning a subject, including transmitting MMW scan energy toward the subject, receiving a MMW return, and, based on the MMW return, generating a MMW return reception signal.

Figure 4:
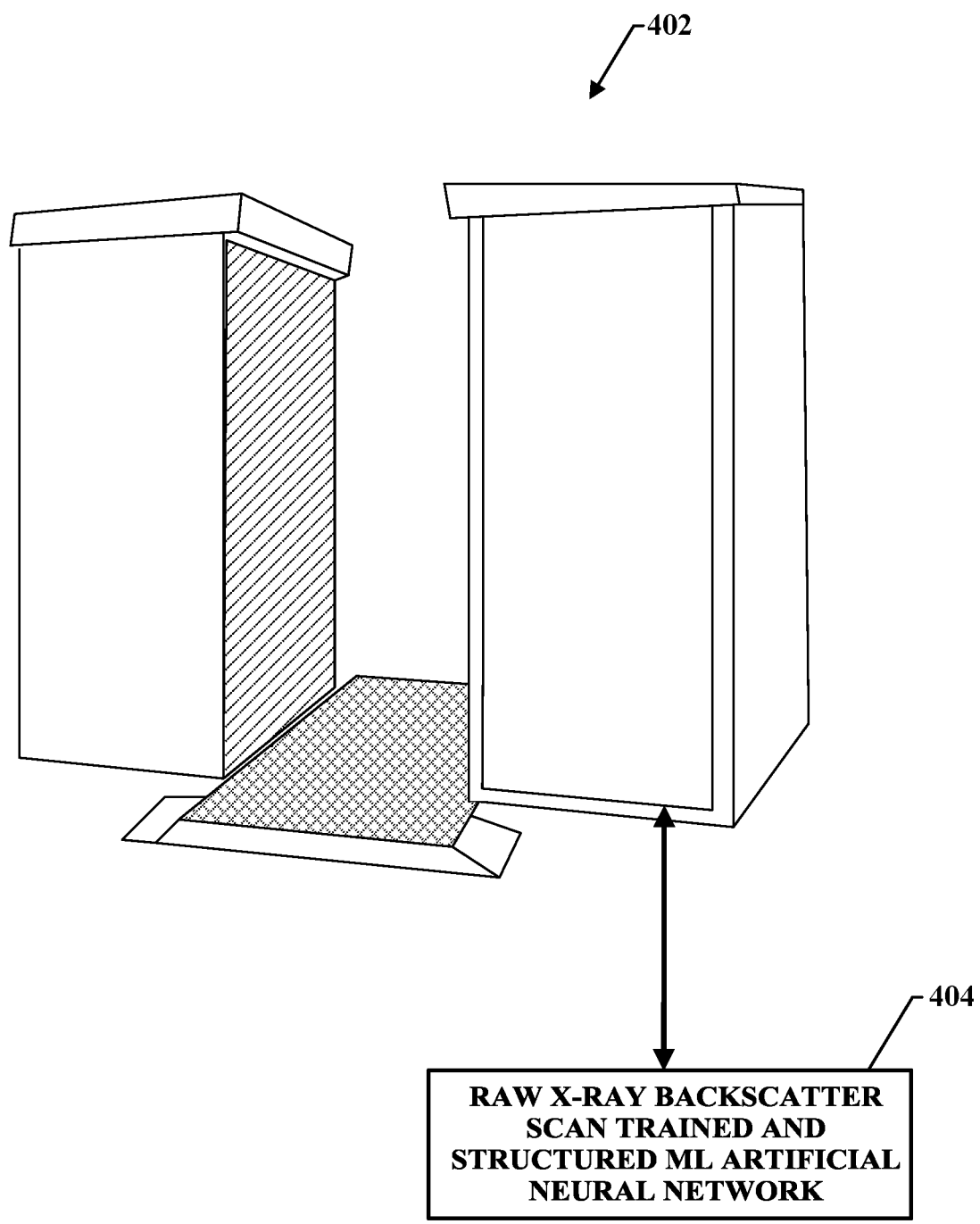
FIG. 4 illustrates a system of backscatter X-ray scanning and raw X-ray backscatter data based AI detecting and classifying of items of interest, in accordance with various embodiments.

FIG. 4 shows an example X-ray backscatter scanner embodiment 400 of a raw X-ray backscatter sample trained, ML classifier system in accordance with this disclosure, including an X-ray backscatter scanner 402 and a raw X-ray backscatter ample trained, ML classifier 404. The X-ray backscatter scanner 402 can include an X-ray transmitter, and X-ray backscatter sensor. The X-ray backscatter sensor can be configured for receiving at least a portion of the X-ray backscatter, and generating, as the EM return reception signal, an X-ray backscatter sensor signal.

Computer System

Figure 5:
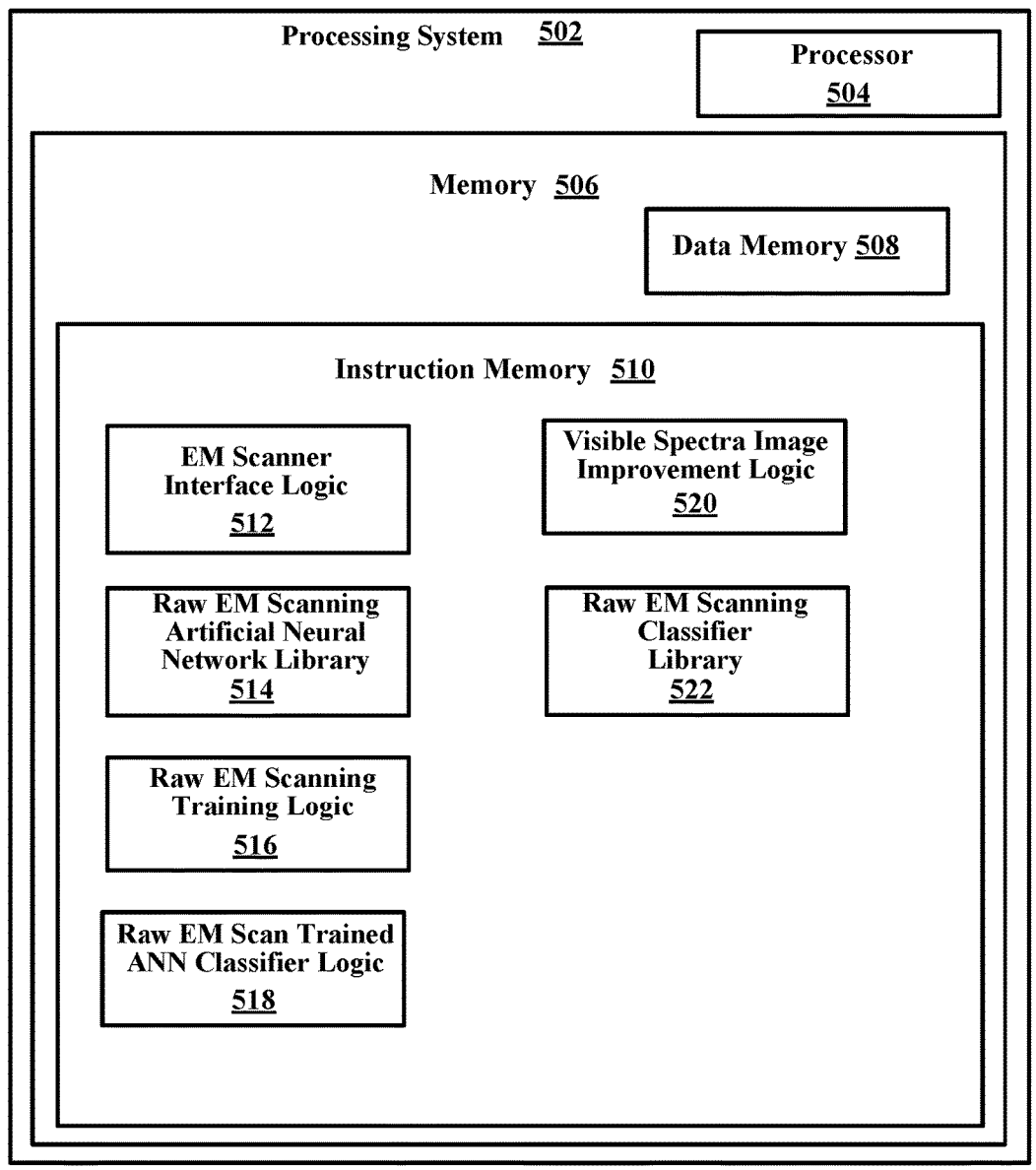
FIG. 5 illustrates, in simplified schematic form, a computing system on which aspects of the present disclosure can be practiced.

FIG. 5 illustrates, in simplified schematic form, a computer system 500 on which aspects of the present disclosure can be practiced. The computer system 500 can include a hardware processor 504 communicatively coupled to a memory 506 which includes an instruction memory 510 and a data memory 508. The instruction memory 510 can be configured to store, on at least a non-transitory computer-readable storage medium as described in greater detail below, executable program code. The hardware processor 502 may include multiple hardware processors and/or multiple processor cores. The hardware processor 502 may include hardware processors from different devices, that cooperate. The computer system 500 system may execute one or more basic instructions included in the memory executable program code in instruction memory 510.

Relationship Between Hardware Processor and Executable Program Code

The relationship between the executable program code in the instruction memory 510 and the hardware processor 502 is structural; the executable program code is provided to the hardware processor 502 by imparting various voltages at certain times across certain electrical connections, in accordance with binary values in the executable program code, to cause the hardware processor to perform some action, as now explained in more detail. The executable program code in the instruction memory 510 can include an EM Scanner Interface Logic 512, a Raw EM Scanning Artificial Neural Network Library 514, a Raw EM Scanning Training Logic 516, a Raw EM Scan Trained ANN Classifier logic 518, a Visible Spectra Image Improvement Logic 520, and Raw EM Scanning Classifier 522.

A hardware processor 502 may be thought of as a complex electrical circuit that is configured to perform a predefined set of basic operations in response to receiving a corresponding basic instruction selected from a predefined native instruction set of codes.

The predefined native instruction set of codes is specific to the hardware processor; the design of the processor defines the collection of basic instructions to which the processor will respond, and this collection forms the predefined native instruction set of codes.

A basic instruction may be represented numerically as a series of binary values, in which case it may be referred to as a machine code. The series of binary values may be represented electrically, as inputs to the hardware processor, via electrical connections, using voltages that represent either a binary zero or a binary one. These voltages are interpreted as such by the hardware processor.

Executable program code may therefore be understood to be a set of machine codes selected from the predefined native instruction set of codes. A given set of machine codes may be understood, generally, to constitute a module. A set of one or more modules may be understood to constitute an application program or "app." An app may interact with the hardware processor directly or indirectly via an operating system. An app may be part of an operating system.

Computer Program Product

A computer program product is an article of manufacture that has a computer-readable medium with executable program code that is adapted to enable a processing system to perform various operations and actions. Stated differently, the executable program code can embody or functionality of instructions that cause a computer, e.g., that cause the processor, to perform particular operations or processes.

A computer-readable medium may be transitory or non-transitory.

A transitory computer-readable medium may be thought of as a conduit by which executable program code may be provided to a computer system, a short-term storage that may not use the data it holds other than to pass it on.

The buffers of transmitters and receivers that briefly store only portions of executable program code when being downloaded over the Internet is one example of a transitory computer-readable medium. A carrier signal or radio frequency signal, in transit, that conveys portions of executable program code over the air or through cabling such as fiber-optic cabling provides another example of a transitory computer-readable medium. Transitory computer-readable media convey parts of executable program code on the move, typically holding it long enough to just pass it on.

Non-transitory computer-readable media may be understood as a storage for the executable program code. Whereas a transitory computer-readable medium holds executable program code on the move, a non-transitory computer-readable medium is meant to hold executable program code at rest. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit.

The following forms of storage exemplify non-transitory computer-readable media: removable storage such as a universal serial bus (USB) disk, a USB stick, a flash disk, a flash drive, a thumb drive, an external solid-state storage device (SSD), a compact flash card, a secure digital (SD) card, a diskette, a tape, a compact disc, an optical disc; secondary storage such as an internal hard drive, an internal SSD, internal flash memory, internal non-volatile memory, internal dynamic random-access memory (DRAM), read-only memory (ROM), random-access memory (RAM), and the like; and the primary storage of a computer system.

Different terms may be used to express the relationship between executable program code and non-transitory computer-readable media. Executable program code may be written on a disc, embodied in an application-specific integrated circuit, stored in a memory chip, or loaded in a cache memory, for example. Herein, the executable program code may be said, generally, to be "in" or "on" a computer-readable media. Conversely, the computer-readable media may be said to store, to include, to hold, or to have the executable program code.

Creation of Executable Program Code

Software source code may be understood to be a human-readable, high-level representation of logical operations. Statements written in the C programming language provide an example of software source code.

Software source code, while sometimes colloquially described as a program or as code, is different from executable program code. Software source code may be processed, through compilation for example, to yield executable program code. The process that yields the executable program code varies with the hardware processor; software source code meant to yield executable program code to run on one hardware processor made by one manufacturer, for example, will be processed differently than for another hardware processor made by another manufacturer.

The process of transforming software source code into executable program code is known to those familiar with this technical field as compilation or interpretation and is not the subject of this application.

User Interface

A computer system may include a user interface controller under control of the processing system that displays a user interface in accordance with a user interface module, i.e., a set of machine codes stored in the memory and selected from the predefined native instruction set of codes of the hardware processor, adapted to operate with the user interface controller to implement a user interface on a display device. Examples of a display device include a television, a projector, a computer display, a laptop display, a tablet display, a smartphone display, a smart television display, or the like.

The user interface may facilitate the collection of inputs from a user. The user interface may be graphical user interface with one or more user interface objects such as display objects and user activatable objects. The user interface may also have a touch interface that detects input when a user touches a display device.

A display object of a user interface may display information to the user. A user activatable object may allow the user to take some action. A display object and a user activatable object may be separate, collocated, overlapping, or nested one within another. Examples of display objects include lines, borders, text, images, or the like. Examples of user activatable objects include menus, buttons, toolbars, input boxes, widgets, and the like.

Communications

The various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

CONCLUSION

For any computer-implemented embodiment, "means plus function" elements will use the term "means;" the terms "logic" and "module" have the meaning ascribed to them above and are not to be construed as generic means. An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation. The indication of any elements or steps as "optional" does not indicate that all other or any other elements or steps are mandatory. The claims define the invention and form part of the specification. Limitations from the written description are not to be read into the claims.

Certain attributes, functions, steps of methods, or sub-steps of methods described herein may be associated with physical structures or components, such as a module of a physical device that, in implementations in accordance with this disclosure, make use of instructions (e.g., computer executable instructions) that may be embodied in hardware, such as an application specific integrated circuit, or that may cause a computer (e.g., a general-purpose computer) executing the instructions to have defined characteristics. There may be a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an application programming interface (API). In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

While certain implementations have been described, these implementations have been presented by way of example only and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure.

What is claimed:

1. A method for training an artificial intelligence (AI) classifier of electromagnetic (EM) scanned items, comprising:
    obtaining a training set of sample raw EM scans, comprising a population of sample in-class raw EM scans and a population of sample not-in-class raw EM scans, the sample in-class raw EM scans including a corresponding block of EM sensor data generated in an EM scan of a spatial region that includes one or more in-class objects, and the sample not-in-class raw EM scan including a corresponding block of EM sensor data generated in an EM scan of a spatial region that includes no in-class objects;
    initializing AI classifier parameters of the AI classifier, and
    applying the AI classifier to a plurality of sample raw EM scans in the training set, measuring errors in results of applying the AI classifier, and updating at least one of the AI classifier parameters based on the errors.

2. The method of claim 1, further comprising:
    performing a training step, using a subset of the training set, the training step including, for each sample raw EM scan in the subset,
        applying the AI classifier to the sample raw EM scan, measuring an error, and
        updating at least one of the AI classifier parameters based on a cost of the error; and
    upon performing the training step, measuring an accuracy of the AI classifier.

3. The method of claim 2, further comprising:
    responsive to the accuracy not meeting an acceptance condition,
        performing another training step, using an other subset of the training set, the other subset of the training set including other sample in-class raw EM scans from the population of sample in-class raw EM scans and other sample not-in-class raw EM scans from the population of sample not-in-class raw EM scans,
        performing another measuring the accuracy, of the AI classifier and
        repeating performing another training step and performing another measuring the accuracy, until detecting a training completion condition being met, the training completion condition being based at least in part on the accuracy.

4. The method of claim 1, further comprising the AI classifier including an artificial neural network (ANN), and the AI classifier parameters including node weights and activation function parameters.

5. The method of claim 1, further comprising the obtaining the training set including a generating of synthetic samples, the synthetic samples being at least a portion of the training set, the generating of synthetic samples being based, at least in part, on a computer simulation model of a particular EM scanner.

6. The method of claim 5, further comprising:
subsequent to the training the AI classifier, EM scanning a subject or a baggage item, using the particular EM scanner; and
applying the AI classifier to a result of the EM scanning the subject or the baggage item.

7. A method for artificial intelligence (AI) classification of electromagnetic (EM) scanned items, comprising:
EM scanning a subject, including transmitting an EM scan energy toward the subject, receiving an EM return, and, based on the EM return, generating an EM return reception signal, and generating a raw EM sample block, based on a sampling of the EM return reception signal;
AI classifying the raw EM sample block between likely including and likely not including samples of EM return from an in-class object; and
generating an alarm, based at least in part on a positive result of the AI classifying.

8. The method of claim 7, further comprising the EM classifying including applying to the raw EM sample block an EM data filtering process that indicates matches between data in the raw EM sample block and a class-characteristic EM feature.

9. The method of claim 7, further comprising the EM scan energy being X-ray, and the EM return including an X-ray backscatter.

10. The method of claim 7 further comprising:
the EM scanning the subject further including receiving, by an X-ray backscatter sensor, at least a portion of an X-ray backscatter and generating, as the EM return reception signal, an X-ray backscatter reception signal.

11. The method of claim 7, further comprising the EM scan energy being a millimeter wave (MMW) scan energy.

12. The method of claim 7, the AI classifying being a first AI classifying, the method further comprising:
generating a two-dimensional (2D) pixel array image file, which includes a 2D array of visible spectra pixels based at least in part on the raw EM sample block;
generating a visible appearance improved 2D pixel array image file, based at least in part on applying a visible appearance improvement process to the 2D pixel array image file; and
second AI classifying the visible appearance improved 2D pixel array image file, between likely including and likely not including a 2D image of in-class object.

13. The method of claim 12, further comprising generating the alarm being further based at least in part on a result of the second AI classifying.

14. The method of claim 12, the visible appearance improvement process including a visible noise filter process;
obtaining a training set of sample raw EM scans, comprising a population of sample in-class raw EM scans and a population of sample not-in-class raw EM scans, each sample in-class raw EM scan including a corresponding block of EM sensor data generated in an EM scan of a spatial region that includes one or more in-class objects, and each sample not-in-class raw EM scan including a corresponding block of EM sensor data generated in an EM scan of a spatial region that includes no in-class objects;
initializing AI classifier parameters of the AI classifier; and
applying the AI classifier to a plurality of sample raw EM scans in the training set, measuring errors in results of applying the AI classifier, and updating at least one of the AI classifier parameters based on the errors, until detecting a training completion condition being met.

15. A tangible, non-transitory computer-readable storage medium, embodying computer-readable instructions that cause a hardware processor to:
perform an artificial intelligence (AI) classification of electromagnetic (EM) scanned items, including:
receiving samples of an EM scanning a subject, including samples of an EM return reception signal, which corresponds to transmitting an EM scan energy toward the subject, receiving an EM return, and, based on the EM return, generating the EM return reception signal,
generating a raw EM sample block, based on the samples of the EM return reception signal, and
perform an AI classifying of the raw EM sample block between likely including and likely not including samples of EM return from an in-class object; and
generating an alarm, based at least in part on a positive result of the AI classifying.

16. The tangible, non-transitory computer-readable storage medium of claim 15, the receiving samples of the EM scanning the subject including receiving samples of X-ray backscatter from X-ray scanning the subject.

17. The tangible, non-transitory computer-readable storage medium of claim 15, the computer-readable instructions including instructions that cause the hardware processor to apply, to the raw EM sample block, an EM data filtering process that indicates matches between data in the raw EM sample block and a class-characteristic EM feature.

18. The tangible, non-transitory computer-readable storage medium of claim 15, the AI classifying being a first AI classifying, the computer-readable instructions further comprising instructions that cause the hardware processor to:
generate a two-dimensional (2D) pixel array image file, which includes a 2D array of visible spectra pixels based at least in part on the raw EM sample block;
generate a visible appearance improved 2D pixel array image file, based at least in part on applying a visible appearance improvement process to the 2D pixel array image file; and
perform a second AI classifying, the second AI classifying being of the visible appearance improved 2D pixel array image file, between likely including and likely not including a 2D image of in-class object.

19. The tangible, non-transitory computer-readable storage medium of claim 18, further comprising generating the alarm being further based at least in part on a result of the second AI classifying.

20. The tangible, non-transitory computer-readable storage medium of claim 15, further including the computer-readable instructions further comprising instructions that cause the hardware processor to:
receive a training set of sample raw EM scans, comprising a population of sample in-class raw EM scans and a population of sample not-in-class raw EM scans, each sample in-class raw EM scan including a corresponding block of EM sensor data generated in an EM scan of a spatial region that includes one or more in-class objects, and each sample not-in-class raw EM scan including a corresponding block of EM sensor data generated in an EM scan of a spatial region that includes no in-class objects;

initializing AI classifier parameters of the AI classifier; and apply the AI classifier to a plurality of sample raw EM scans in the training set, measuring errors in results of applying the AI classifier, and updating at least one of the AI classifier parameters based on the errors, until detecting a training completion condition being met.

* * * * *